S. L. NICHOLSON.
FLUID MEASURING DEVICE.
APPLICATION FILED MAR. 23, 1908.
981,789.
Patented Jan. 17, 1911.
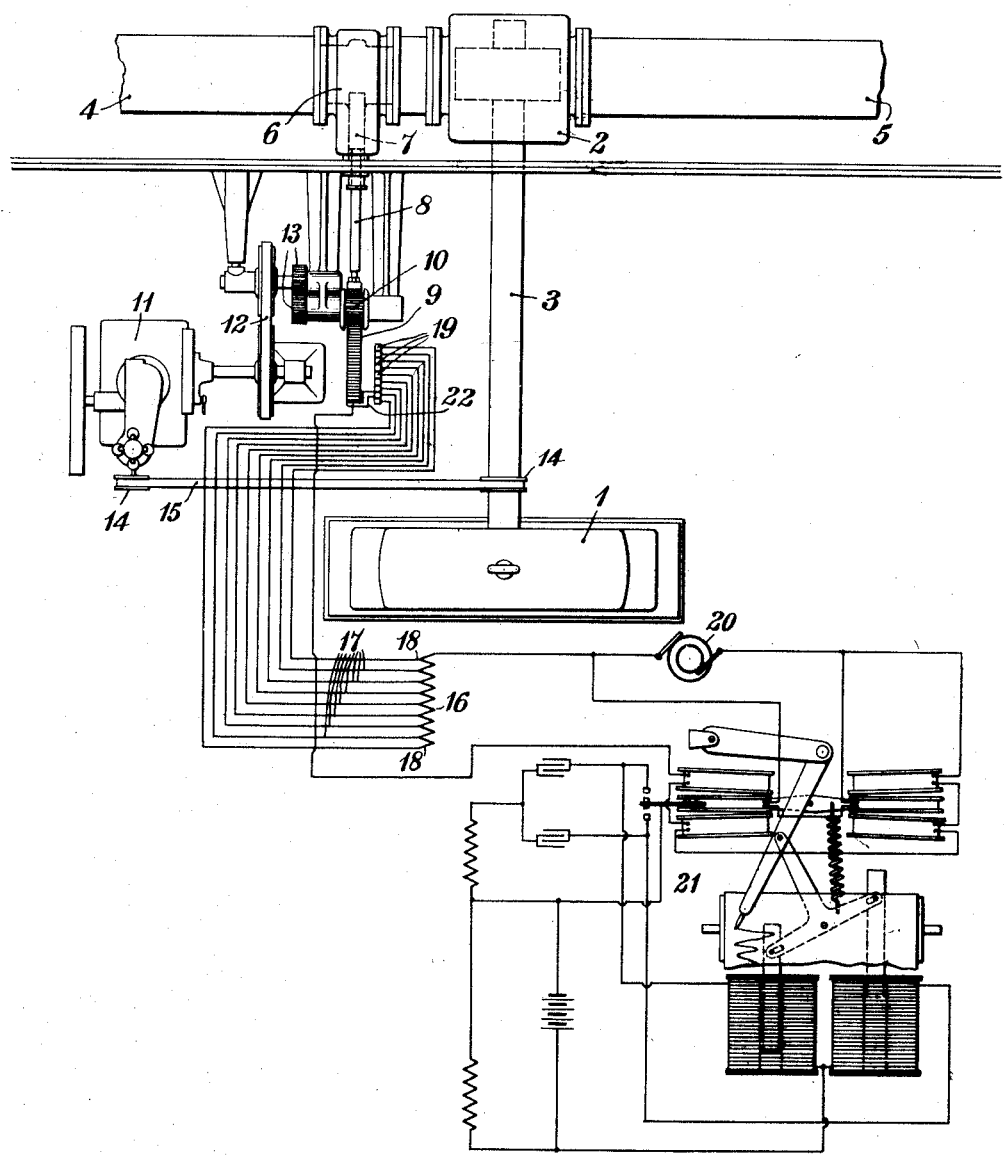
WITNESSES:
C. L. Belcher
R. J. Dearborn
INVENTOR
Samuel L. Nicholson
BY
Wesley E. Carr
ATTORNEY

UNITED STATES PATENT OFFICE.

SAMUEL L. NICHOLSON, OF PITTSBURG, PENNSYLVANIA, ASSIGNOR TO WESTINGHOUSE ELECTRIC AND MANUFACTURING COMPANY, A CORPORATION OF PENNSYLVANIA.

FLUID-MEASURING DEVICE.

981,789.     Specification of Letters Patent.     Patented Jan. 17, 1911.

Application filed March 23, 1908. Serial No. 422,761.

*To all whom it may concern:*

Be it known that I, SAMUEL L. NICHOLSON, a citizen of the United States, and a resident of Pittsburg, in the county of Allegheny and State of Pennsylvania, have invented a new and useful Improvement in Fluid-Measuring Devices, of which the following is a specification.

My invention relates to systems and apparatus which utilize fluids under predetermined pressure or heads and it has special reference to power systems embodying fluid-propelled prime movers.

The object of my invention is to provide automatic means for continuously recording the adjustments of gates or valves in fluid-feeder pipes that shall be simple and durable in construction and accurate and reliable in operation.

When turbines or other water motors are employed for driving a substantially constant speed electric generator or other similar load, it is desirable to automatically adjust the gate or valve, through which the water is admitted for driving the motor, according to the motor load variations. Various means have been suggested and employed for producing this result, of which a Lombard governor is a well known example.

When a device of this character is employed, the gate, under ordinary circumstances, is continually being adjusted and, on this account, considerable difficulty has been experienced in accurately determining the total amount of water supplied to the motor. Since a number of power consumers often buy their water supply from a single power company it is especially desirable to obtain a record of this kind.

According to my present invention, I provide a resistance having a plurality of intermediate taps that are connected to a series of stationary contact members, said members being engaged by a movable contact arm operatively connected to the movable member of the gate or valve. I supply energy to the resistance from any suitable source and connect an electric instrument in series with the resistance. By suitably calibrating the mechanism, the record produced by the electric measuring instrument will obviously represent the opening provided by the gate or valve.

The single figure of the accompanying drawings is a diagrammatic plan view of a recording system arranged in accordance with my invention.

Referring to the drawing, an electric generator 1, which is illustrated as an example of a variable load, is driven by a fluid motor or turbine 2, the moving parts of the two devices being mounted on a common driving shaft 3. Water or other suitable fluid is supplied through a feeder pipe 4 to the turbine 2 and is exhausted through a pipe 5, a gate valve 6 being located in the feeder pipe 4 adjacent to the turbine.

The gate valve 6 is provided with a movable member 7 having a stem 8 to which a toothed rack 9 is secured. The rack 9 is engaged by a pinion 10 which is driven by a speed governor 11 to which it is connected by a belt 12 and gear wheels 13.

The governor 11 is operatively connected to the shaft 3 by pulleys 14 and a belt 15 and is adapted to drive the pinion 10 in the one direction or the other according as the speed of the shaft 3 exceeds or falls below a predetermined value. Consequently, as the load on the generator 1 is varied the opening provided by the gate valve 6 will be correspondingly varied and the speed of the driving motor 2 will remain substantially constant.

A resistance 16, having a plurality of intermediate taps 17 and end terminals 18 which are severally connected to stationary contact members 19, is energized from any suitable source of electric energy, such as generator 20, a recording electric instrument 21 being connected in series with the resistance. The amount of resistance included within the circuit may be varied by the gate 6, since a movable contact arm 22, which engages the stationary contact members 19, is secured to the rack 9 and is thereby operatively connected to the movable member 7 of the valve.

The electric measuring instrument 21 may be either a wattmeter or an ammeter and is so connected as to measure the energy consumed in the active portion of the resistance 16, the current coils being connected in series with the resistance and the voltage coils being connected across the source of energy 20.

I deem it unnecessary to describe in detail the structure and mode of operation of the instrument shown since it is intended to be representative of any suitable measuring instrument and is fully illustrated and described in a copending application Serial No. 307,738, filed March 23, 1906, by Frank Conrad and Paul MacGahan, assignors to the Westinghouse Electric & Manufacturing Company.

Though I have illustrated a specific arrangement, my invention is not restricted thereto and I desire that modifications which do not depart from the spirit of my invention shall be included within its scope.

I claim as my invention:

1. The combination with a conduit for power-applying fluid, a valve or gate in said conduit and means for automatically adjusting the position thereof in accordance with the power demand, of an electro-responsive means for continuously recording the adjustment of said valve or gate.

2. The combination with a fluid-propelled prime mover, a feeder pipe therefor, and a valve or gate located in the pipe, of means for automatically varying the position of the valve or gate according to the speed variations of the prime mover, and an electro-responsive means for continuously recording the valve or gate adjustments.

3. The combination with a fluid-propelled prime mover, a throttle valve or gate therefor, a governor for varying the opening of the throttle valve according as the speed of the prime mover varies, and a variable resistance having a movable member operatively connected to the throttle valve, of an electric instrument for continuously recording the active portion of the resistance.

4. The combination with a fluid-propelled prime mover, a throttle valve or gate, a rack operatively connected to the gate, and a governor for automatically varying the valve or gate opening according as the speed of the prime mover varies, a resistance having a plurality of intermediate taps severally connected to a series of stationary contact members, a movable engaging contact member secured to the rack, and a source of energy for the resistance, of an electric measuring instrument for continuously recording the energy consumed in the active portion of the resistance.

In testimony whereof, I have hereunto subscribed my name this 16th day of March, 1908.

S. L. NICHOLSON.

Witnesses:
R. S. FEICHT,
BIRNEY HINES.